United States Patent
Shaheen (10) Patent No.: US 8,483,693 B2
(45) Date of Patent: Jul. 9, 2013

(54) METHOD AND APPARATUS FOR LOCAL CALL ROUTING FOR HOME EVOLVED NODE-B

(75) Inventor: Kamel M. Shaheen, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 115 days.

(21) Appl. No.: 12/917,971

(22) Filed: Nov. 2, 2010

(65) Prior Publication Data

US 2011/0105131 A1    May 5, 2011

Related U.S. Application Data

(60) Provisional application No. 61/257,695, filed on Nov. 3, 2009.

(51) Int. Cl.
*H04W 40/00* (2009.01)
*H04M 1/00* (2006.01)

(52) U.S. Cl.
USPC ............................. 455/445; 455/554.1

(58) Field of Classification Search
USPC ............................................. 455/445
See application file for complete search history.

(56) References Cited

U.S. PATENT DOCUMENTS 7,822,036 B2 * 10/2010 Rajsic et al. ............... 370/392

FOREIGN PATENT DOCUMENTS

WO    2009/041780    4/2009

OTHER PUBLICATIONS

Third Generation Partnership Project, "Technical Specification Group Services and System Aspects; Service Requirements for Home NodeBs and Home eNodeBs (Release 9)," 3GPP TS 22.220 v 9.2.0, Sep. 2009.
Third Generation Partnership Project, "Technical Specification Group Services and System Aspects; Service Requirements for Home Node B (HNB) and Home eNode B (HeNB) (Release 9)," 3GPP TS 22.220 v 9.5.0, Sep. 2010.
Third Generation Partnership Project, "Technical Specification Group Services and System Aspects; Service Requirements for Home NodeBs and Home eNodeBs (Release 10)," 3GPP TS 22.220 v 10.0.0, Sep. 2009.
Third Generation Partnership Project, "Technical Specification Group Services and System Aspects; Service Requirements for Home Node B (HNB) and Home eNode B (HeNB) (Release 10)," 3GPP TS 22.220 v 10.4.0, Sep. 2010.
Third Generation Partnership Project, "Technical Specification Group Services and System Aspects; Architecture aspects of Home NodeB (HNB) and Home eNode B (HeNB) (Release 9)," 3GPP TR 23.830 V9.0.0, (Sep. 2009).

(Continued)

*Primary Examiner* — Melody Mehrpour
*Assistant Examiner* — Natasha Cosme
(74) *Attorney, Agent, or Firm* — Volpe and Koenig, P.C.

(57) ABSTRACT

The method and apparatus are provided for local call routing for a home Node-B (HNB) and a home evolved Node-B (H(e)NB) using a local authentication, authorization, and accounting (AAA) server and a local private branch exchange (PBX) server without assistance from the core network. A H(e)NB including a receiver for receiving a call setup request that includes an identity (ID) of a target wireless transmit/receive unit (WTRU), and a processor for determining whether the call setup request can be routed locally by comparing the ID of the target WTRU with a list of current members of the closed subscriber group (CSG), and on a condition that the determination is positive, forwarding the call set up request to a local private branch exchange (PBX) server, is described.

15 Claims, 8 Drawing Sheets

OTHER PUBLICATIONS

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.1.0 (Sep. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.5.0 (Sep. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.10.0 (Sep. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.1.0 (Sep. 2010).

* cited by examiner

METHOD AND APPARATUS FOR LOCAL CALL ROUTING FOR HOME EVOLVED NODE-B

CROSS REFERENCE TO RELATED APPLICATION

This application claims the benefit of U.S. Provisional Application Ser. No. 61/257,695 filed on Nov. 3, 2009 which is hereby incorporated by reference as if fully set forth herein.

FIELD OF INVENTION

This application is related to wireless communications.

BACKGROUND

A goal of the third generation partnership project (3GPP) long term evolution (LTE) program is to develop new technology, new architecture and new methods for LTE settings and configurations to provide improved spectral efficiency, reduced latency, better utilization of radio resources for faster user experiences and richer applications and lower cost services.

As part of these efforts, the 3GPP has introduced the concept of a home evolved Node-B (HeNB) for LTE networks. The 3GPP is also considering a home Node-B (HNB) for wideband code division multiple access (WCDMA). An HNB is customer premise equipment (CPE) using an Internet Protocol (IP) backhaul that connects a 3GPP wireless transmit/receive unit (WTRU) over a Universal Terrestrial Radio Access Network (UTRAN) wireless air interface to a mobile operator's network. An HeNB is CPE using an IP backhaul that connects a 3GPP WTRU over an Evolved-UTRAN (EU-TRAN) wireless air interface to a mobile operator's network.

The 3GPP standard body has defined the HNB and H(e) NB. The H(e)NB refers to a physical device that may be similar to a wireless local area network (WLAN) access point (AP). The H(e)NB provides users with access to LTE services over small service areas, such as homes or small offices.

An H(e)NB allows local IP access to the home based network, which may provide access for a directly connected (i.e., using H(e)NB radio access) IP capable WTRU to other IP capable devices in the home. The traffic generated for local IP access may not traverse the operator's network except the H(e)NB messages sent and received from the mobile operator's network or core network.

Figure 1:
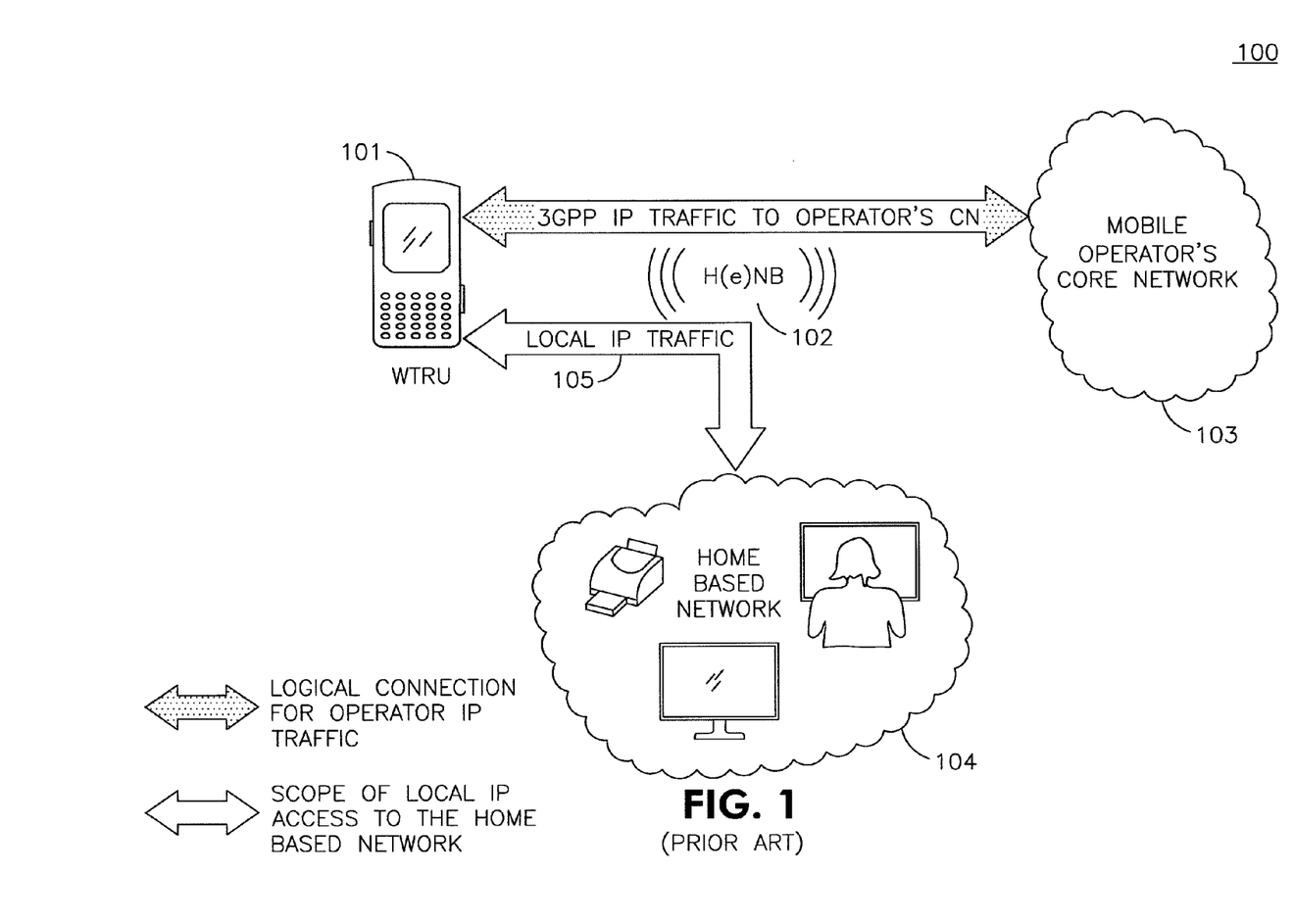
FIG. 1 shows an example of an enterprise network that provides IP connectivity via WLAN or H(e)NB.

FIG. 1 shows an example of an enterprise network 100 that provides IP connectivity via WLAN or other means such as H(e)NB 102. The enterprise network includes, for example, an H(e)NB 102, a printer, a computer, and a television 104 and a WTRU 101. The enterprise network may include access to scanners, public or private folders, digital media players, and the like.

The WTRU 101 may be configured to transmit and receive IP traffic via the H(e)NB 102 and mobile operator's core network 103. The local IP traffic 105 (i.e., non 3GPP signaling) created by the H(e)NB 102 through the network may involve transmission/reception of the data at the IP layer or other layers.

The current WLAN or H(e)NB deployed according to 3GPP standards do not include providing calling plans between terminals supported by these technologies. It would be beneficial if the H(e)NB was not limited to home devices and provided access to other WTRUs. This may allow a call to another subscriber within the same H(e)NB without going through the 3GPP core network. Currently, H(e)NB calls have to be routed all the way back to the core network (i.e., switching centers or IMS) to complete the call set up. A need exists for a H(e)NB that is not limited to the home devices and a H(e)NB that provides access to other WTRUs, without going through the core network.

SUMMARY

A method and apparatus are provided for local call routing for a HNB and a H(e)NB using a local authentication, authorization, and accounting (AAA) server and a local private branch exchange (PBX) server without assistance from the core network. A H(e)NB including a receiver for receiving a call setup request that includes an identity (ID) of a target wireless transmit/receive unit (WTRU), and a processor for determining whether the call setup request can be routed locally by comparing the ID of the target WTRU with a list of current members of the closed subscriber group (CSG), and on a condition that the determination is positive, forwarding the call set up request to a local private branch exchange (PBX) server, is described.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 2A:
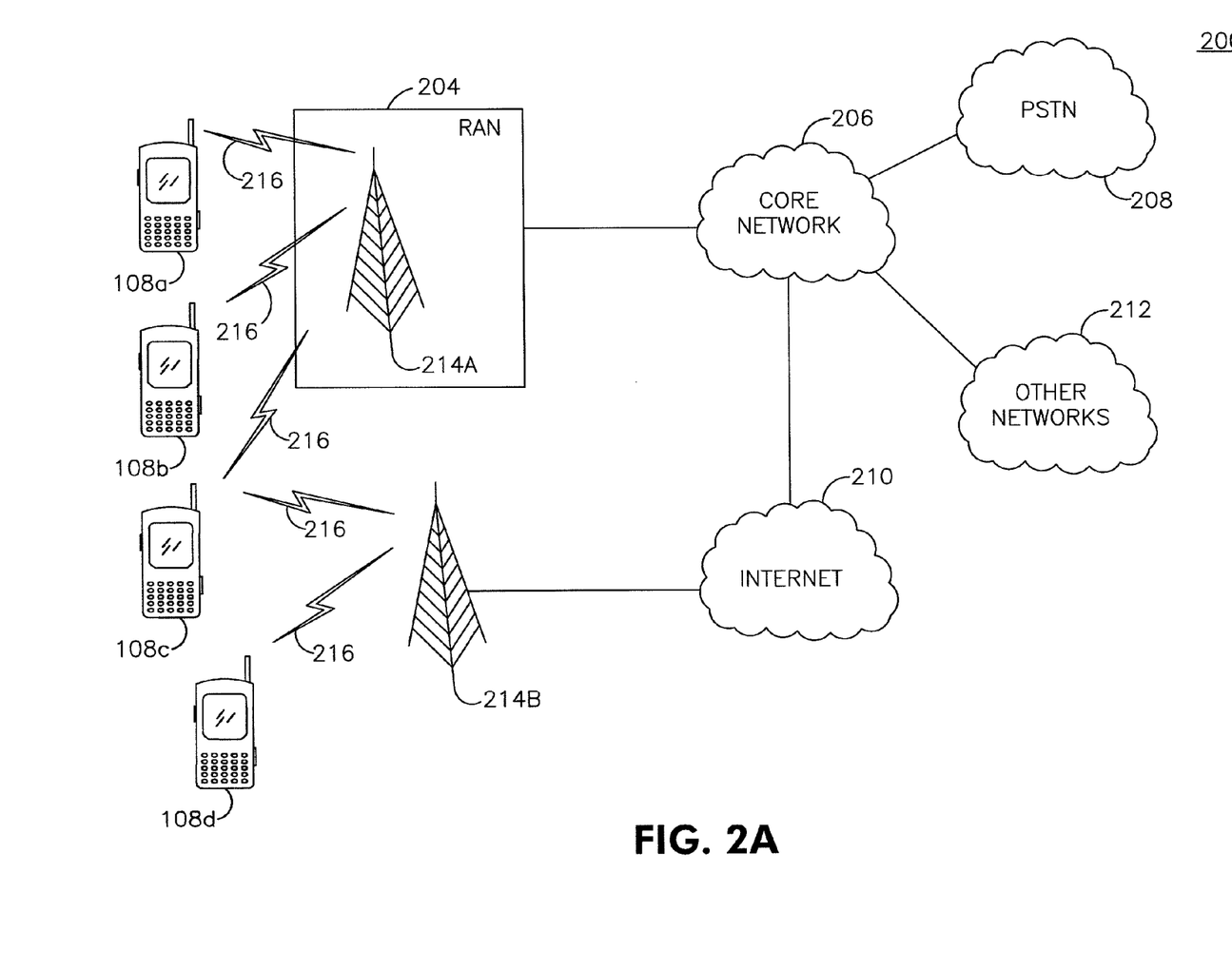
FIG. 2A is a system diagram of an example communications system in which one or more disclosed embodiments may be implemented.

FIG. 2A is a diagram of an example communications system 200 in which one or more disclosed embodiments may be implemented. The communications system 200 may be a multiple access system that provides content, such as voice, data, video, messaging, broadcast, etc., to multiple wireless users. The communications system 200 may enable multiple wireless users to access such content through the sharing of system resources, including wireless bandwidth. For example, the communications systems 200 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 2A, the communications system 200 may include wireless transmit/receive units (WTRUs) 108a, 108b, 108c, 108d, a radio access network (RAN) 204, a core network 206, a public switched telephone network (PSTN) 208, the Internet 210, and other networks 212, though it will be appreciated that the disclosed embodiments contemplate any number of WTRUs, base stations, networks, and/or network elements. Each of the WTRUs 108a, 108b, 108c, 108d may be any type of device configured to operate and/or communicate in a wireless environment. By way of example, the WTRUs 108a, 108b, 108c, 108d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 200 may also include a base station 214a and a base station 214b. Each of the base stations 214a, 214b may be any type of device configured to wirelessly interface with at least one of the WTRUs 108a, 108b, 108c, 108d to facilitate access to one or more communication networks, such as the core network 206, the Internet 210, and/or the networks 212. By way of example, the base stations 214a, 214b may be a base transceiver station (BTS), a Node-B, an eNode B, a Home Node B, a H(e)NB, a site controller, an access point (AP), a wireless router, and the like. While the base stations 214a, 214b are each depicted as a single element, it will be appreciated that the base stations 214a, 214b may include any number of interconnected base stations and/or network elements.

The base station 214a may be part of the RAN 204, which may also include other base stations and/or network elements (not shown), such as a base station controller (BSC), a radio network controller (RNC), relay nodes, etc. The base station 214a and/or the base station 214b may be configured to transmit and/or receive wireless signals within a particular geographic region, which may be referred to as a cell (not shown). The cell may further be divided into cell sectors. For example, the cell associated with the base station 214a may be divided into three sectors. Thus, in one embodiment, the base station 214a may include three transceivers, i.e., one for each sector of the cell. In another embodiment, the base station 214a may employ multiple-input multiple output (MIMO) technology and, therefore, may utilize multiple transceivers for each sector of the cell.

The base stations 214a, 214b may communicate with one or more of the WTRUs 108a, 108b, 108c, 108d over an air interface 216, which may be any suitable wireless communication link (e.g., radio frequency (RF), microwave, infrared (IR), ultraviolet (UV), visible light, etc.). The air interface 216 may be established using any suitable radio access technology (RAT).

More specifically, as noted above, the communications system 200 may be a multiple access system and may employ one or more channel access schemes, such as CDMA, TDMA, FDMA, OFDMA, SC-FDMA, and the like. For example, the base station 214a in the RAN 204 and the WTRUs 108a, 108b, 108c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 108a, 108b, 108c may implement a radio technology such as Evolved UMTS Terrestrial Radio Access (E-UTRA), which may establish the air interface 216 using Long Term Evolution (LTE) and/or LTE-Advanced (LTE-A).

In other embodiments, the base station 214a and the WTRUs 108a, 108b, 108c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 214b in FIG. 2A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 214b and the WTRUs 108c, 108d may implement a radio technology such as IEEE 802.11 to establish a wireless local area network (WLAN). In another embodiment, the base station 214b and the WTRUs 108c, 108d may implement a radio technology such as IEEE 802.15 to establish a wireless personal area network (WPAN). In yet another embodiment, the base station 214b and the WTRUs 108c, 108d may utilize a cellular-based RAT (e.g., WCDMA, CDMA2000, GSM, LTE, LTE-A, etc.) to establish a picocell or femtocell. As shown in FIG. 2A, the base station 214b may have a direct connection to the Internet 210. Thus, the base station 214b may not be required to access the Internet 210 via the core network 206.

The RAN 204 may be in communication with the core network 206, which may be any type of network configured to provide voice, data, applications, and/or voice over internet protocol (VoIP) services to one or more of the WTRUs 108a, 108b, 108c, 108d. For example, the core network 206 may provide call control, billing services, mobile location-based services, pre-paid calling, Internet connectivity, video distribution, etc., and/or perform high-level security functions, such as user authentication. Although not shown in FIG. 2A, it will be appreciated that the RAN 204 and/or the core network 206 may be in direct or indirect communication with other RANs that employ the same RAT as the RAN 204 or a different RAT. For example, in addition to being connected to the RAN 204, which may be utilizing an E-UTRA radio technology, the core network 206 may also be in communication with another RAN (not shown) employing a GSM radio technology.

The core network 206 may also serve as a gateway for the WTRUs 108a, 108b, 108c, 108d to access the PSTN 208, the Internet 210, and/or other networks 212. The PSTN 208 may include circuit-switched telephone networks that provide plain old telephone service (POTS). The Internet 210 may include a global system of interconnected computer networks and devices that use common communication protocols, such as the transmission control protocol (TCP), user datagram protocol (UDP) and the internet protocol (IP) in the TCP/IP internet protocol suite. The networks 212 may include wired or wireless communications networks owned and/or operated by other service providers. For example, the networks 212 may include another core network connected to one or more RANs, which may employ the same RAT as the RAN 204 or a different RAT.

Some or all of the WTRUs 108a, 108b, 108c, 108d in the communications system 200 may include multi-mode capabilities, i.e., the WTRUs 108a, 108b, 108c, 108d may include multiple transceivers for communicating with different wireless networks over different wireless links. For example, the WTRU 108c shown in FIG. 2A may be configured to communicate with the base station 214a, which may employ a cellular-based radio technology, and with the base station 214b, which may employ an IEEE 802 radio technology.

Figure 2B:
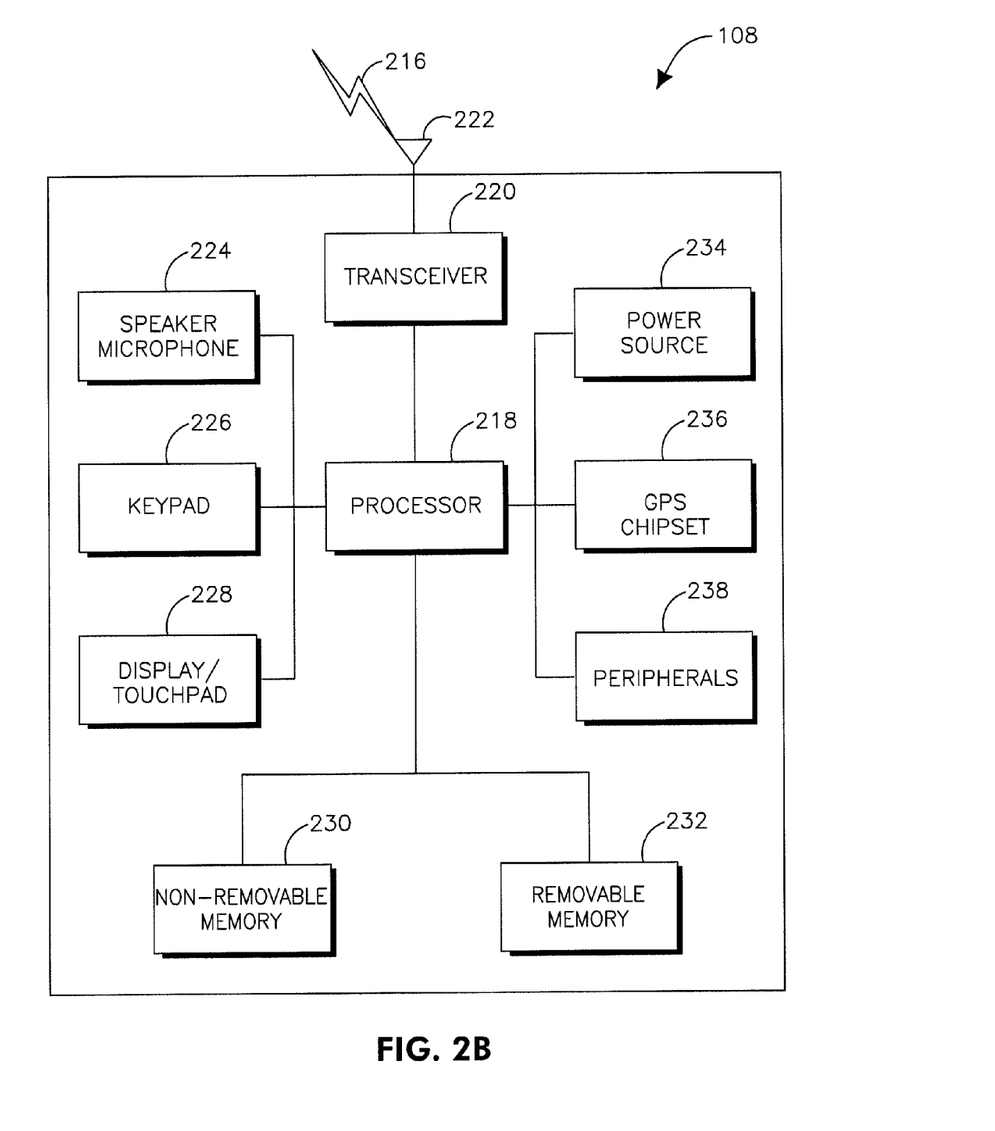
FIG. 2B is a system diagram of an example wireless transmit/receive unit (WTRU) that may be used within the communications system illustrated in FIG. 2A.

FIG. 2B is a system diagram of an example WTRU 108. As shown in FIG. 2B, the WTRU 108 may include a processor 218, a transceiver 220, a transmit/receive element 222, a speaker/microphone 224, a keypad 226, a display/touchpad 228, non-removable memory 230, removable memory 232, a power source 234, a global positioning system (GPS) chipset 236, and other peripherals 238. It will be appreciated that the WTRU 108 may include any sub-combination of the foregoing elements while remaining consistent with an embodiment.

The processor 218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 108 to operate in a wireless environment. The processor 218 may be coupled to the transceiver 220, which may be coupled to the transmit/receive element 222. While FIG. 2B depicts the processor 218 and the transceiver 220 as separate components, it will be appreciated that the processor 218 and the transceiver 220 may be integrated together in an electronic package or chip.

The transmit/receive element 222 may be configured to transmit signals to, or receive signals from, a base station (e.g., the base station 214a) over the air interface 216. For example, in one embodiment, the transmit/receive element 222 may be an antenna configured to transmit and/or receive RF signals. In another embodiment, the transmit/receive element 222 may be an emitter/detector configured to transmit and/or receive IR, UV, or visible light signals, for example. In yet another embodiment, the transmit/receive element 222 may be configured to transmit and receive both RF and light signals. It will be appreciated that the transmit/receive element 222 may be configured to transmit and/or receive any combination of wireless signals.

In addition, although the transmit/receive element 222 is depicted in FIG. 2B as a single element, the WTRU 108 may include any number of transmit/receive elements 222. More specifically, the WTRU 108 may employ MIMO technology. Thus, in one embodiment, the WTRU 108 may include two or more transmit/receive elements 222 (e.g., multiple antennas) for transmitting and receiving wireless signals over the air interface 216.

The transceiver 220 may be configured to modulate the signals that are to be transmitted by the transmit/receive element 222 and to demodulate the signals that are received by the transmit/receive element 222. As noted above, the WTRU 108 may have multi-mode capabilities. Thus, the transceiver 220 may include multiple transceivers for enabling the WTRU 108 to communicate via multiple RATs, such as UTRA and IEEE 802.11, for example.

The processor 218 of the WTRU 108 may be coupled to, and may receive user input data from, the speaker/microphone 224, the keypad 226, and/or the display/touchpad 228 (e.g., a liquid crystal display (LCD) display unit or organic light-emitting diode (OLED) display unit). The processor 218 may also output user data to the speaker/microphone 224, the keypad 226, and/or the display/touchpad 228. In addition, the processor 218 may access information from, and store data in, any type of suitable memory, such as the non-removable memory 230 and/or the removable memory 232. The non-removable memory 230 may include random-access memory (RAM), read-only memory (ROM), a hard disk, or any other type of memory storage device. The removable memory 232 may include a subscriber identity module (SIM) card, a memory stick, a secure digital (SD) memory card, and the like. In other embodiments, the processor 218 may access information from, and store data in, memory that is not physically located on the WTRU 108, such as on a server or a home computer (not shown).

The processor 218 may receive power from the power source 234, and may be configured to distribute and/or control the power to the other components in the WTRU 108. The power source 234 may be any suitable device for powering the WTRU 108. For example, the power source 234 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 218 may also be coupled to the GPS chipset 236, which may be configured to provide location information (e.g., longitude and latitude) regarding the current location of the WTRU 108. In addition to, or in lieu of, the information from the GPS chipset 236, the WTRU 108 may receive location information over the air interface 216 from a base station (e.g., base stations 214a, 214b) and/or determine its location based on the timing of the signals being received from two or more nearby base stations. It will be appreciated that the WTRU 108 may acquire location information by way of any suitable location-determination method while remaining consistent with an embodiment.

The processor 218 may further be coupled to other peripherals 238, which may include one or more software and/or hardware modules that provide additional features, functionality and/or wired or wireless connectivity. For example, the peripherals 238 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 2C:
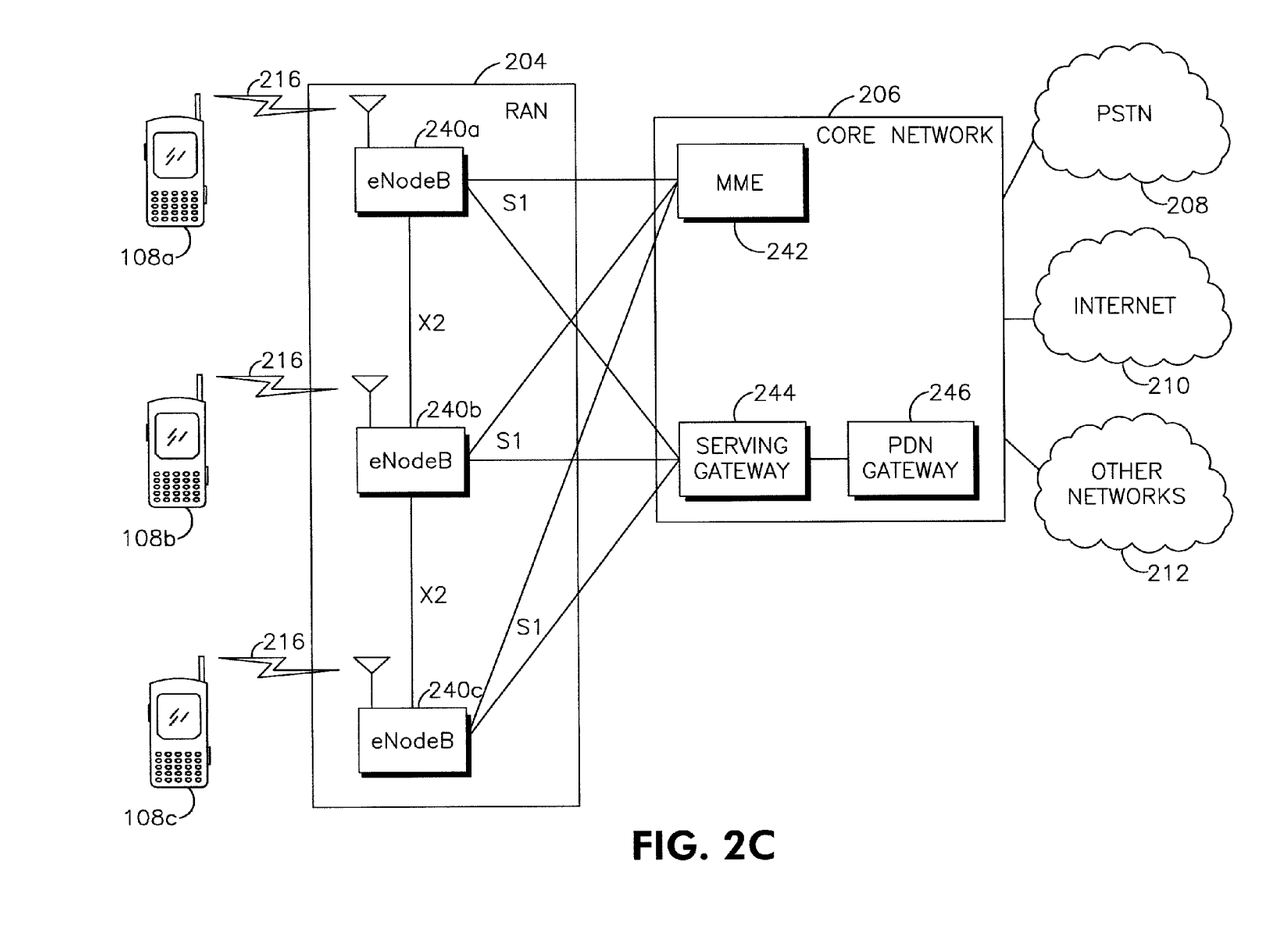
FIG. 2C is a system diagram of an example radio access network and an example core network that may be used within the communications system illustrated in FIG. 2A.

FIG. 2C is a system diagram of the RAN 204 and the core network 206 according to an embodiment. As noted above, the RAN 204 may employ an E-UTRA radio technology to communicate with the WTRUs 108a, 108b, 108c over the air interface 216. The RAN 204 may also be in communication with the core network 206.

The RAN 204 may include eNode-Bs 240a, 240b, 240c, though it will be appreciated that the RAN 204 may include any number of eNode-Bs while remaining consistent with an embodiment. The eNode-Bs 240a, 240b, 240c may each include one or more transceivers for communicating with the WTRUs 108a, 108b, 108c over the air interface 216. In one embodiment, the eNode-Bs 240a, 240b, 240c may implement MIMO technology. Thus, the eNode-B 240a, for example, may use multiple antennas to transmit wireless signals to, and receive wireless signals from, the WTRU 108a.

Each of the eNode-Bs 240a, 240b, 240c may be associated with a particular cell (not shown) and may be configured to handle radio resource management decisions, handover decisions, scheduling of users in the uplink and/or downlink, and the like. As shown in FIG. 2C, the eNode-Bs 240a, 240b, 240c may communicate with one another over an X2 interface.

The core network 206 shown in FIG. 2C may include a mobility management gateway (MME) 242, a serving gateway 244, and a packet data network (PDN) gateway 246. While each of the foregoing elements are depicted as part of the core network 206, it will be appreciated that any one of these elements may be owned and/or operated by an entity other than the core network operator.

The MME 242 may be connected to each of the eNode-Bs 240a, 240b, 240c in the RAN 204 via an S1 interface and may serve as a control node. For example, the MME 242 may be responsible for authenticating users of the WTRUs 108a, 108b, 108c, bearer activation/deactivation, selecting a particular serving gateway during an initial attach of the WTRUs 108a, 108b, 108c, and the like. The MME 242 may also provide a control plane function for switching between the RAN 204 and other RANs (not shown) that employ other radio technologies, such as GSM or WCDMA.

The serving gateway 244 may be connected to each of the eNode Bs 240a, 240b, 240c in the RAN 204 via the S1 interface. The serving gateway 244 may generally route and forward user data packets to/from the WTRUs 108a, 108b, 108c. The serving gateway 244 may also perform other functions, such as anchoring user planes during inter-eNode B handovers, triggering paging when downlink data is available for the WTRUs 108a, 108b, 108c, managing and storing contexts of the WTRUs 108a, 108b, 108c, and the like.

The serving gateway 244 may also be connected to the PDN gateway 246, which may provide the WTRUs 108a, 108b, 108c with access to packet-switched networks, such as the Internet 210, to facilitate communications between the WTRUs 108a, 108b, 108c and IP-enabled devices.

The core network 206 may facilitate communications with other networks. For example, the core network 206 may provide the WTRUs 108a, 108b, 108c with access to circuit-switched networks, such as the PSTN 208, to facilitate communications between the WTRUs 108a, 108b, 108c and traditional land-line communications devices. For example, the core network 206 may include, or may communicate with, an IP gateway (e.g., an IP multimedia subsystem (IMS) server) that serves as an interface between the core network 206 and the PSTN 208. In addition, the core network 206 may provide the WTRUs 108a, 108b, 108c with access to the networks 212, which may include other wired or wireless networks that are owned and/or operated by other service providers.

Described herein is additional private branch exchange (PBX) functionality used in conjunction with an H(e)NB. It is proposed that a WTRU that operates in a macro 3GPP environment solution may also be used in an H(e)NB for establishing a call to another subscriber within the same H(e)NB without going to the 3GPP core network.

Figure 3:
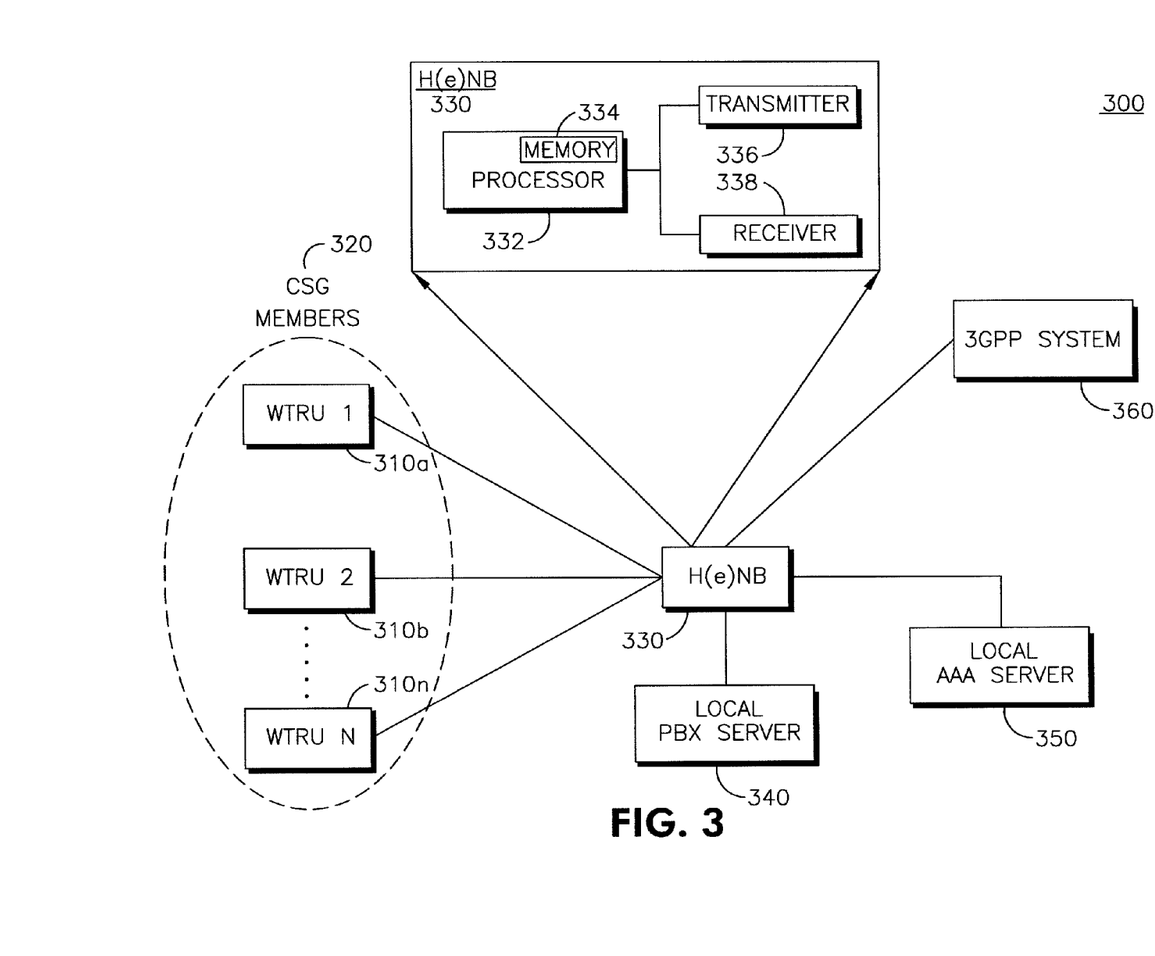
FIG. 3 shows a diagram illustrating a local network architecture for routing local call within a H(e)NB to CSG members in accordance with an embodiment.

FIG. 3 shows a diagram illustrating a network architecture for routing local calls within H(e)NB to other closed subscriber group (CSG) members 300. This diagram includes a CSG 320, a H(e)NB 330, a local PBX server 340, a local authentication, authorization and accounting (AAA) server 350 and a 3GPP system 360. The CSG members 320 include a list of WTRUs, WTRU 1 310a, and WTRU 2 310b to WTRU N 310n. The CSG members 320 include the WTRUs 310a-310n that has been granted access to the H(e)NB 330. The H(e)NB 330 may include a processor 332 with an optional linked memory 334, transmitter 336, and receiver 338. The processor is configured to communication with local or the 3GPP backhaul. A local PBX server 340 may be configured to be used for initial connection and establishment between the WTRU 1 and the WRTU N. Because almost all private branch exchanges today are automatic, the abbreviation PBX usually implies a private automatic branch exchange (PABX).

The local AAA server 350 may be configured to be used for user identity verification, service access options based on the subscriber profiles, and collecting and storing billing-related data including calling plans specifically targeted for the H(e)NB. The H(e)NB maintains a connection to the 3GPP system 360 provider, such as a wireless operator. The local AAA server 350 and the local PBX server 340 are connected to the H(e)NB 330, with which the WTRUs communicate. The H(e)NB 330 is connected to the 3GPP system 360.

Figure 4:
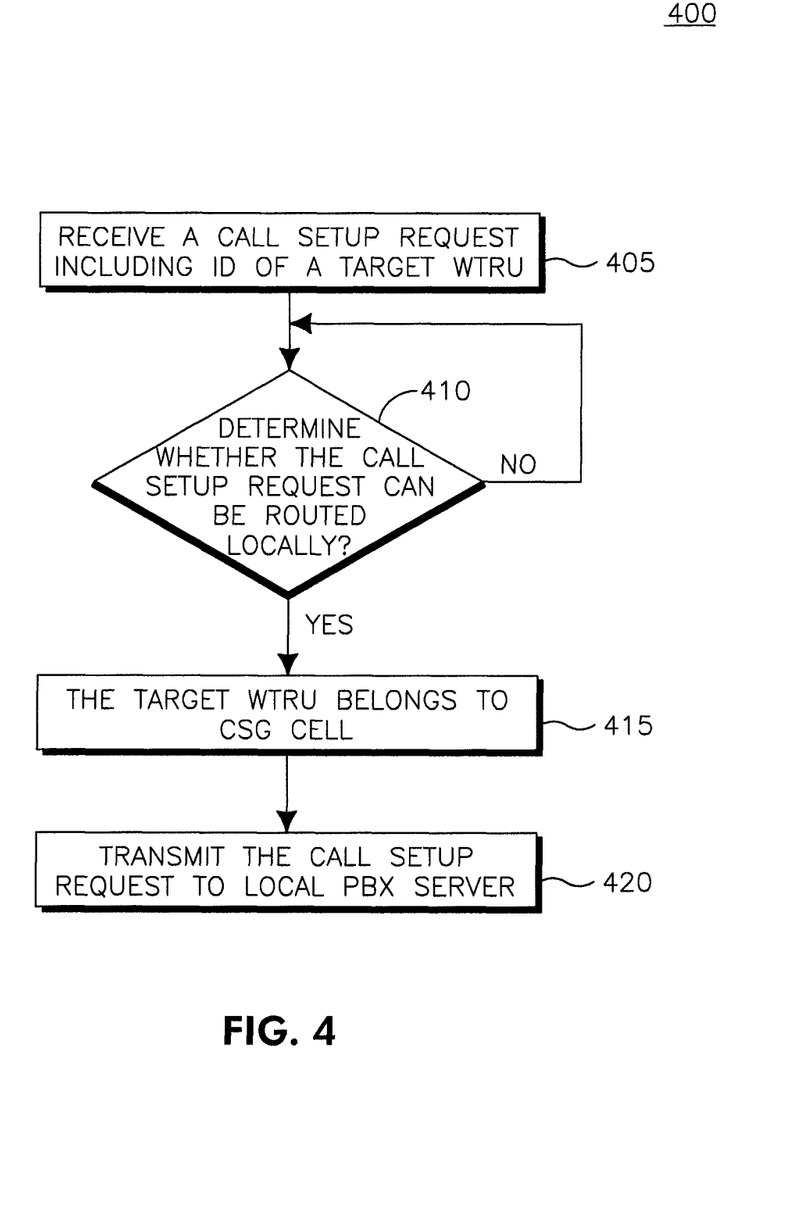
FIG. 4 shows a flow diagram illustrating a local call setup request process in accordance with an embodiment.

FIG. 4 shows a flow diagram 400 for a local call setup request. A receiver receives a call setup request that includes an ID of a target WTRU 405. A processor determines whether the call setup request can be routed inside the network by checking the ID of the target WTRU 410 by determining whether the target WTRU is a member of the CSG 415. On a condition that the processor determines that the call setup request can not be routed, the processor is configured to check the ID of the target WTRU 410, and forward to the 3GPP network. On a condition that the call can be routed locally, forwarding the call setup request that includes the ID of the target WTRU and the ID of a source WTRU (i.e., WTRU 1) to the local PBX server 420.

Figure 5A:
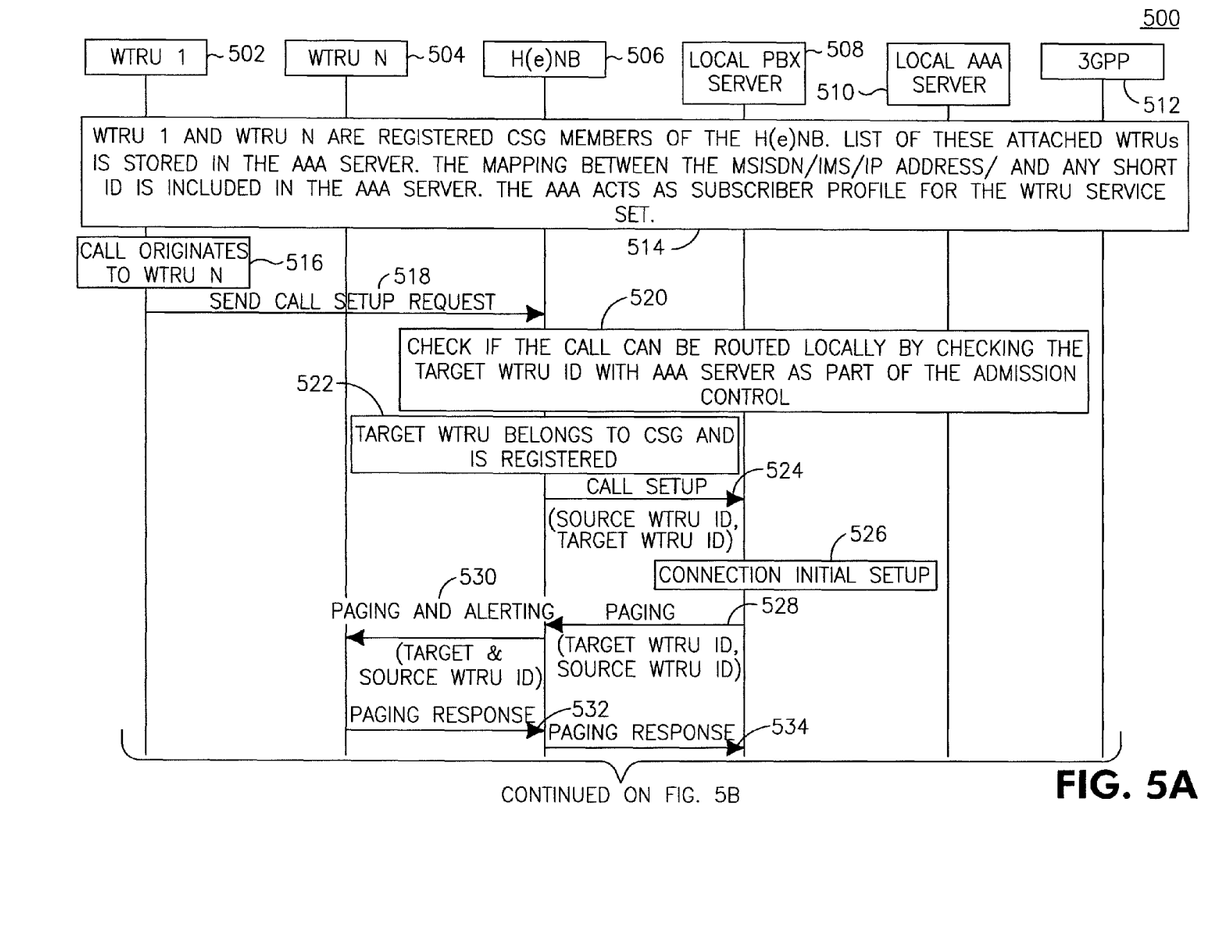
FIGS. 5A and 5B show a flow diagram of local a call establishment at an H(e)NB.
Figure 5B:
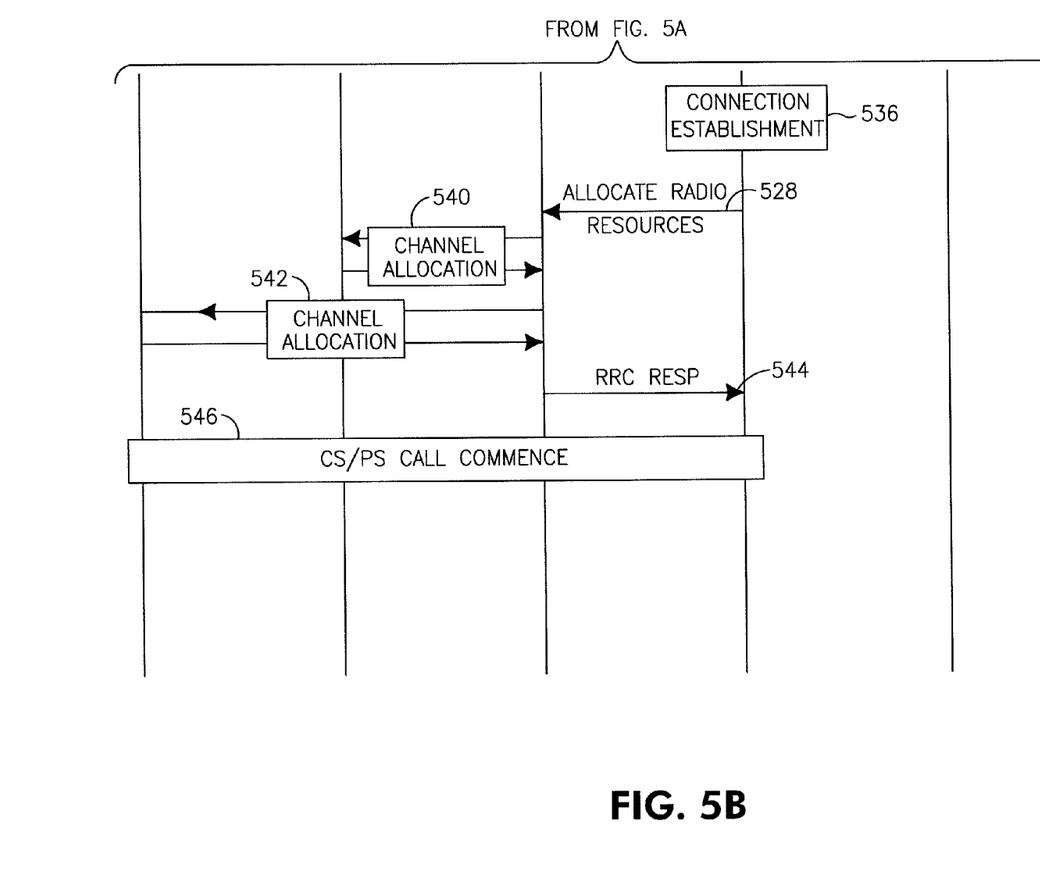

FIGS. 5A and 5B is a flow diagram of a local call establishment in an H(e)NB 500. WTRU 1 502 and WTRU N 504 are registered CSG members of the H(e)NB 506. A list of these attached WTRUs and their status may be stored in the local AAA server 510. The mapping between the Mobile Subscriber Integrated Services Digital Network Number (MSISDN)/International Mobile Subscriber Identity (IMSI)/IP address and any short ID may also be included in the local AAA server 510. The local AAA server 510 may act as the subscriber profile for the WRTU service set, including service access options 514.

Within the coverage area of the H(e)NB 506, WTRU 1 502 originates a call 516 to WTRU N 504, which usually starts with a call setup request message sent 518 from WTRU 1 502 to the H(e)NB 506. The call setup request message contains the ID of the target WTRU 504, which may indicate whether the call is a local call 518. The H(e)NB 506 sends a message to the local AAA server 510 to determine whether the call can be routed locally by checking the ID of the target WTRU 504 with the local AAA server 510 as part of the admission control 520. This may be accomplished by checking if the ID of the target WTRU 504 is registered and belongs to the CSG 520.

Upon confirmation of the inclusion of the target WTRU 504 in the CSG 522, the H(e)NB 506 is configured to send a call setup request message 524 containing the ID of the source WTRU 502 and target WTRU 504 to the local PBX server 508. The local PBX server 508 may begin the initial setup connection phase 526 by sending a page message including the ID of the target WTRU 504 and source WTRU 502 to the H(e)NB 528. The H(e)NB 506 may be configured to send a paging and alerting message containing the ID of the target WTRU 504 and source WTRU 502 to the WTRU N 530. The WTRU N 504 may be configured to send a paging response message back to the H(e)NB 532, which may be configured to forward the paging response message back to the local PBX server 534.

Continuing onto FIG. 5B, the local PBX server 508 begins the connection establishment phase by proceeding upon confirmation at the local PBX server of the paging response of the target WTRU 536. On a condition that the determination at 520 is negative (i.e., call can not be routed locally), the 3GPP system 512 may be notified of the connection for network status purposes (e.g., busy call options or location updates). In this a case, the target WTRU ID 504 is not found at the local AAA server and the connection maybe established at the 3GPP.

The local PBX server 508 may send a message to allocate radio resources to the H(e)NB 538. Once radio resources are allocated, the channel allocation phase is established 540. The channel allocation includes sending and acknowledging the allocation of channel resources between the H(e)NB and the WTRU N 540. The channel allocation phase further includes sending and acknowledging the allocation of channel resources between the H(e)NB and the WTRU 1 542.

Upon confirmation of the channel allocation phases, the H(e)NB 506 may send a Radio Resource Control (RRC) response message 544 to the local PBX server 508 and the call commences 546. The call may be a Circuit Switched (CS) or Packet Switched (PS) call, which may encompass WTRU 1, WTRU N, H(e)NB and local PBX server.

The H(e)NB may include a receiver, a processor, a memory, a removable memory, a transmitter, a GPS device, an integrated or removable universal subscriber identifier module (USIM) module, and a trusted platform module (TPM). The TPM is a secure hardware component that provides a secure storage and execution environment. And, a network card includes a modem (i.e., baseband) processor. Alternatively, the USIM module may be implemented as an integrated or removable universal integrated circuit card (UICC), or as an embedded functionality implemented collectively by the processor, the TPM, and the memory. Alternatively, the network card may be integrated into the processor. The processor is configured to process one or more H(e)NB applications.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) configured to communicate with a home evolved node B (H(e)NB), wherein the WTRU is a member of a closed subscriber group (CSG), the WTRU comprising:
   a transmitter configured to transmit a call setup request to the H(e)NB, wherein the call setup request includes an identity (ID) of a target WTRU and an ID of the WTRU, wherein the target WTRU is a member of the CSG; and
   a receiver configured to receive a channel allocation from a local private branch exchange (PBX) server via the H(e)NB.

2. A Home eNode B (H(e)NB) comprising:
   a receiver configured to receive a call setup request that includes an identity (ID) of a target wireless transmit/receive unit (WTRU); and
   a processor configured to determine whether the call setup request can be routed locally by comparing the ID of the target WTRU with a list of IDs of current members of a closed subscriber group (CSG) to determine whether the target WTRU is a member of the CSG, and on a condition that the determination is positive, forward the call set up request to a local private branch exchange (PBX) server.

3. The H(e)NB as in claim 2 wherein the receiver is configured to receive a paging and alerting message from the local PBX server, the message including the ID of the target WTRU and an ID of a source WTRU.

4. The H(e)NB as in claim 3 wherein the processor is configured to forward a paging and alerting message to the target WTRU, the message including the ID of the target WTRU and the ID of the source WTRU.

5. The H(e)NB as in claim 4 wherein the receiver is configured to receive a paging response from the target WTRU.

6. The H(e)NB as in claim 5 wherein the processor is configured to forward a paging response to the local PBX server.

7. The H(e)NB as in claim 6 wherein the processor is configured to establish the call request connection.

8. The H(e)NB as in claim 2, wherein on a condition that the processor determines that the call setup request can not be routed locally, the processor is further configured to establish a connection between the source WTRU and the target WTRU via a network.

9. A method implemented in a Home eNode B (H(e)NB), the method comprising:
   receiving a call setup request that includes an identity (ID) of a target wireless transmit/receive unit (WTRU); and
   determining whether the call setup request can be routed locally by comparing the ID of the target WTRU with a list of IDs of current members of the closed subscriber group (CSG) to determine whether the target WTRU is a member of the CSG, and on a condition that the determination is positive, forwarding the call set up request to a local private branch exchange (PBX) server.

10. The method as in claim 9, further comprising:
    receiving a paging and alerting message from the local PBX server, the message including the ID of the target WTRU and an ID of a source WTRU.

11. The method as in claim 10, further comprising:
forwarding a paging and alerting message to the target WTRU, wherein the message includes the ID of the target WTRU and the ID of the source WTRU.

12. The method as in claim 11 wherein a paging response is received from the target WTRU.

13. The method as in claim 12 wherein a paging response is forwarded to the local PBX server.

14. The method as in claim 13 wherein a call request connection is established.

15. The method as in claim 9, wherein on a condition that the call setup request can not be routed, establishing a connection between the source WTRU and the target WTRU via a network.

* * * * *

UNITED STATES PATENT AND TRADEMARK OFFICE
CERTIFICATE OF CORRECTION

| | | |
|---|---|---|
| PATENT NO. | : 8,483,693 B2 | Page 1 of 1 |
| APPLICATION NO. | : 12/917971 | |
| DATED | : July 9, 2013 | |
| INVENTOR(S) | : Kamel M. Shaheen | |

It is certified that error appears in the above-identified patent and that said Letters Patent is hereby corrected as shown below:

IN THE ABSTRACT

On the Title Page, at line 5, after "network.", delete "A" and insert therefor --An--.

IN THE SPECIFICATION

In Column 1, line 26, delete "(HeNB)" and insert therefor --(H(e)NB)--;
In Column 1, line 33, delete "HeNB" and insert therefor --H(e)NB--;
In Column 2, line 3, delete "a" and insert therefor --an--;
In Column 2, line 4, delete "a" and insert therefor --an--;
In Column 2, line 10, after "for" delete "a" and insert therefor --an--;
In Column 2, line 10, after "and" delete "a" and insert therefor --an--;
In Column 2, line 13, after "network." delete "A" and insert therefor --An--;
In Column 2, line 40, delete "a" and insert therefor --an--;
In Column 2, line 44, delete "of local a" and insert therefor --of a local--;
In Column 3, line 30, after "a Home Node B," delete "a" and insert therefor --an--;
In Column 7, line 63, after "320," delete "a" and insert therefor --an--;
In Column 8, line 7, delete "WRTU" and insert therefor --WTRU--;
In Column 8, line 32, delete "is" and insert therefor --show--;
In Column 8, line 41, delete "WRTU" and insert therefor --WTRU--;
In Column 8, line 63, delete "530" and insert therefor --504--;
In Column 9, line 8, after "this" delete "a";
In Column 9, line 9, delete "maybe" and insert therefor --may be--.

Signed and Sealed this
Ninth Day of June, 2015

Michelle K. Lee
*Director of the United States Patent and Trademark Office*